US009587379B2

(12) United States Patent
Sohn et al.

(10) Patent No.: US 9,587,379 B2
(45) Date of Patent: Mar. 7, 2017

(54) SYSTEM FOR REDUCING FUEL CONSUMPTION IN EXCAVATOR

(71) Applicant: DOOSAN INFRACORE CO., LTD., Incheon (KR)

(72) Inventors: Won Sun Sohn, Seoul (KR); Myeong Ku Yeo, Incheon (KR); Kyung Tae Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 263 days.

(21) Appl. No.: 14/369,043

(22) PCT Filed: Dec. 18, 2012

(86) PCT No.: PCT/KR2012/010975
§ 371 (c)(1),
(2) Date: Jun. 26, 2014

(87) PCT Pub. No.: WO2013/100457
PCT Pub. Date: Jul. 4, 2013

(65) Prior Publication Data

US 2014/0366517 A1 Dec. 18, 2014

(30) Foreign Application Priority Data

Dec. 28, 2011 (KR) ........................ 10-2011-0144105

(51) Int. Cl.

| | |
|---|---|
| ***F16D 31/02*** | (2006.01) |
| ***E02F 9/22*** | (2006.01) |
| ***F15B 11/17*** | (2006.01) |
| ***F15B 13/04*** | (2006.01) |

(52) U.S. Cl.
CPC .......... *E02F 9/2232* (2013.01); *E02F 9/2235* (2013.01); *E02F 9/2239* (2013.01);
(Continued)

(58) Field of Classification Search
CPC F15B 11/17; F15B 13/06; F15B 13/07; E02F 9/2239; E02F 9/2242
See application file for complete search history.

(56) References Cited

U.S. PATENT DOCUMENTS 5,148,676 A * 9/1992 Moriya ................. E02F 9/2242 60/422
5,680,759 A * 10/1997 Chung .................... F15B 11/17 60/421
(Continued)

FOREIGN PATENT DOCUMENTS

CN 1126283 A 7/1996
EP 0593782 A1 4/1994
(Continued)

OTHER PUBLICATIONS

European Search Report dated Dec. 1, 2015 for European Application No. 12863060.5, 6 pages.
(Continued)

*Primary Examiner* — Michael Leslie
(74) *Attorney, Agent, or Firm* — John D. Veldhuis-Kroeze; Westman, Champlin & Koehler, P.A.

(57) ABSTRACT

The present disclosure relates to a system for reducing fuel consumption in an excavator, and more particularly, to a system for reducing fuel consumption in an excavator, which may reduce fuel consumption when an excavator travels.

A technical problem of the present disclosure, which will be achieved, is to provide a system for reducing fuel consumption in an excavator, which may reduce fuel consumption while improving traveling performance of an excavator.

10 Claims, 5 Drawing Sheets

(52) U.S. Cl.
CPC .......... *E02F 9/2242* (2013.01); *E02F 9/2282* (2013.01); *E02F 9/2285* (2013.01); *E02F 9/2292* (2013.01); *E02F 9/2296* (2013.01); *F15B 11/17* (2013.01); *F15B 13/0401* (2013.01); *F15B 2211/20523* (2013.01); *F15B 2211/20546* (2013.01); *F15B 2211/20576* (2013.01); *F15B 2211/3116* (2013.01); *F15B 2211/88* (2013.01)

(56) References Cited

U.S. PATENT DOCUMENTS 6,708,490 B2 * 3/2004 Toji ....................... E02F 9/2239 60/421
7,520,130 B2 * 4/2009 Tanaka .................... F15B 11/17 60/421

FOREIGN PATENT DOCUMENTS

| | | | |
|---|---|---|---|
| EP | 0719948 | A2 | 7/1996 |
| EP | 1847654 | A2 | 10/2007 |
| JP | 2005-068845 | | 3/2005 |
| KR | 10-1999-0086116 | | 12/1999 |
| KR | 10-2005-0100116 | | 10/2005 |
| KR | 10-2006-0096081 | | 9/2006 |
| KR | 10-2011-0074388 | | 6/2011 |

OTHER PUBLICATIONS

Chinese Office Action dated Jul. 27, 2015 for Chinese Application No. 201280065239.6, 6 pages.
Search Report dated Mar. 4, 2013 and written in Korean with English translation for International Patent Application No. PCT/KR2012/010975 filed Dec. 18, 2012, 5 pages.

* cited by examiner

-- PRIOR ART --

SYSTEM FOR REDUCING FUEL CONSUMPTION IN EXCAVATOR

CROSS-REFERENCE TO RELATED APPLICATION

This Application is a Section 371 National Stage Application of International Application No. PCT/KR2012/010975, filed Dec. 18, 2012, and published, not in English, as WO 2013/100457 on Jul. 4, 2013.

FIELD OF THE DISCLOSURE

The present disclosure relates to a system for reducing fuel consumption in an excavator, and more particularly, to a system for reducing fuel consumption in an excavator, which may reduce fuel consumption when an excavator travels.

BACKGROUND OF THE DISCLOSURE

In general, an excavator operates a hydraulic pump and a pilot pump using power outputted from an engine, and a hydraulic pump discharges hydraulic oil, and provides the hydraulic oil to a plurality of control units.

Actuators are connected to the plurality of control units, respectively.

In addition, a pilot pump discharges pilot hydraulic oil to provide the pilot hydraulic oil to spools of the plurality of control units, and when a worker manipulates a joystick, pilot hydraulic oil is provided to the control unit which corresponds to the manipulation.

When the spool of the corresponding control unit is opened, the hydraulic oil is provided to a corresponding actuator, and the corresponding actuator is operated.

The plurality of actuators may include a traveling motor, a swing motor, a boom actuator, an arm actuator, a bucket actuator, and the like, and may further include an option actuator or an outrigger, or a dozer.

Hereinafter, a general excavator hydraulic circuit system will be described with reference to attached FIG. 1.

As illustrated in FIG. 1, the excavator hydraulic circuit system includes a configuration which generates hydraulic pressure of the hydraulic oil, and a control unit which controls a flow of the hydraulic oil.

The configuration in which hydraulic pressure of the hydraulic oil is generated is a configuration in which an output shaft of the engine E is connected to shafts of the first and second hydraulic pumps P1 and P2, and the pilot pump P3, and when the engine E is operated, the first and second hydraulic pumps P1 and P2 discharge the hydraulic oil, and the pilot pump P3 discharges the pilot hydraulic oil.

Meanwhile, the hydraulic oil discharged from the first hydraulic pump P1 is connected to a drain line 30 through a first bypass line 10, and the hydraulic oil discharged from the second hydraulic pump P2 is connected to the drain line 30 through a second bypass line 20.

Meanwhile, a safety line 40 is connected to outlet sides of the first and second hydraulic pumps P1 and P2, and a safety valve unit 50 is provided in the safety line 40.

When pressure generated in the hydraulic oil in the hydraulic circuit system becomes higher than allowable pressure, the safety valve unit 50 is opened to discharge the hydraulic oil.

In the first bypass line 10, a traveling control unit 100, an option control unit 110, a swing control unit 120, a second boom control unit 130*b*, and a first arm control unit 140*a* are sequentially disposed. Hereinafter, the option control unit 110, the swing control unit 120, and the second boom control unit 130*b*, and the first arm control unit 140*a* are called a first control unit group A.

In addition, an outrigger control unit 150, a bucket control unit 160, a first boom control unit 130*a*, and a second arm control unit 140*b* are sequentially disposed in the second bypass line 20. Hereinafter, the outrigger control unit 150, the bucket control unit 160, the first boom control unit 130*a*, and the second arm control unit 140*b* are called a second control unit group B.

Meanwhile, a first inlet side of the first arm control unit 140*a*, and an inlet side of the second arm control unit 140*b* are connected through a first confluence line 41.

In addition, a first parallel line 12 has one side that is connected with an outlet side of the first hydraulic pump P1, and the other side that is connected with the aforementioned first confluence line 41, and has a check valve so as to prevent a reverse flow.

In addition, a second parallel line 22 has one side that is connected with an outlet side of the second hydraulic pump P2, and the other end that is connected with a second inlet side in the second arm control unit 140*b*, and has a check valve to prevent a reverse flow.

The first parallel line 12 provides the hydraulic oil to the control unit that is provided in the first bypass line 10, and the second parallel line 22 provides the hydraulic oil to the control unit that is provided in the second bypass line 20.

According to the hydraulic circuit system in an excavator, which is configured as describe above, a cut off function is operated when a worker selects the traveling mode by manipulating traveling/work selection switches in the driver seat.

When the cut off function is operated, the pilot hydraulic oil is provided to the traveling control unit 100 and traveling is possible, but the pilot line of the control unit of another actuator is shut off, such that other operations, for example, upper body turning, moving a boom upward and downward, arm dump/cloud, and bucket dump/cloud other than the traveling are not performed even when a joystick is manipulated.

However, the general excavator hydraulic circuit system has the following problems.

When the engine E is operated, the first and second hydraulic pumps P1 and P2 and the pilot pump P3 are simultaneously operated, and the hydraulic oil is provided from the first hydraulic pump p1 to the traveling control unit 100.

The pilot pump P3 may be used to discharge the pilot hydraulic oil so as to control the traveling control unit 100, or control other valves.

However, there is a problem in that the hydraulic oil, which is discharged from the second hydraulic pump P2, is not utilized, but is immediately discharged.

Therefore, the engine needs to be operated with the higher number of revolutions (rpm) of the engine, for example, 2,000 rpm, that is higher than when general work is performed, in order to supply the hydraulic oil that is sufficient for traveling when the excavator travels.

That is, the number of revolutions of the engine when the excavator travels is relatively high in comparison with a case in which the number of revolutions of the engine is set to be 1,500 rpm to 1,800 rpm when general work is performed.

Therefore, in the related art, an engine having high output needs to be selected so as to output the high number of revolutions in order to satisfy traveling performance, and as a result, there is a problem in that a loss is increased when the engine is operated, and fuel efficiency deteriorates.

Meanwhile, there is difficulty in determining a capacity specification of a hydraulic pump in consideration of both traveling performance and performance of working machines.

For example, in a case in which the capacity of the traveling motor is determined in consideration of traveling performance and traction force, a traveling speed may be designed by the number of revolutions of the engine and the capacity of the hydraulic pump.

However, since the capacity of the hydraulic pump is determined depending on performance of the working machine, the number of revolutions of the engine, which satisfies the traveling speed, is inevitably determined regardless of the intention of a designer.

As a result, because there is no performance factor which may efficiently design a traveling system in order to satisfy traveling target performance (traction force and traveling speed) of the excavator, there is a problem in that efficiency of the traveling system is inevitably much lower than efficiency of the working machine.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Therefore, a technical problem of the present disclosure, which will be achieved, is to provide a system for reducing fuel consumption in an excavator, which may reduce fuel consumption while improving traveling performance of an excavator.

A technical problem to be achieved in the present disclosure is not limited to the aforementioned technical problems, and any other not-mentioned technical problem will be obviously understood from the description below by those skilled in the technical field to which the present disclosure pertains.

In order to achieve the technical problem, a system for reducing fuel consumption in an excavator according to the present disclosure includes: an engine E which outputs power; first and second hydraulic pumps P1 and P2 which are driven by power of the engine, and discharge first hydraulic oil and second hydraulic oil, respectively; a first bypass line 10 which guides the first hydraulic oil to a drain line 30 via a traveling control unit 100 and a first control unit group A; a second bypass line 20 which guides the second hydraulic oil to the drain line 30 via a second control unit group B; a switch unit 220 which allows any one of a working mode and a traveling mode to be selected; and a confluence control unit which supplies the second hydraulic oil of the second bypass line 20 to an upstream side of the traveling control unit 100 by selectively connecting the first bypass line 10 and the second bypass line 20, in which when the traveling mode is selected, the first bypass line and the second bypass line are connected by the confluence control unit, such that the first hydraulic oil and the second hydraulic oil are merged and then supplied to the traveling control unit 100.

In addition, the confluence control unit of the system for reducing fuel consumption in an excavator according to the present disclosure includes: a bypass line 42 which branches off from the first bypass line 10 at an upstream side of the traveling control unit 100, and supplies the first hydraulic oil to the first control unit group A while allowing the first hydraulic oil to bypass the traveling control unit 100; and a first confluence control unit 200 which selectively connects the second bypass line 20 and the bypass line 42, in which the first confluence control unit 200 allows the first hydraulic oil to be provided to the first control unit group A through the bypass line 42 and allows the second hydraulic oil to be provided to the second control unit group B when the working mode is selected, and blocks connection between the second bypass line 20 and the drain line 30 when the traveling mode is selected, such that the second hydraulic oil of the second bypass line 20 is supplied to an upstream side of the traveling control unit 100 through the bypass line 42, and the first hydraulic oil and the second hydraulic oil are merged and then supplied to the traveling control unit 100.

In addition, the first confluence control unit of the system for reducing fuel consumption in an excavator according to the present disclosure blocks connection between the bypass line 42 and the first control unit group A when the first hydraulic oil and the second hydraulic oil are merged by the selection of the traveling mode, such that all hydraulic oil, which is discharged from the first hydraulic pump P1 and the second hydraulic pump P2, is supplied to the traveling control unit 100.

In addition, the confluence control unit of the system for reducing fuel consumption in an excavator according to the present disclosure includes: a bypass cut valve unit 300 which is installed on the second bypass line 20 at a downstream side of the second control unit group B, and selectively blocks connection between the second bypass line 20 and the drain line 30; a second confluence line 43 which connects an upstream side of the traveling control unit 100 of the first bypass line 10 and the second bypass line 20; and a second confluence control unit 310 which is disposed on the second confluence line 43, and opens and closes the second confluence line 43 so that the second hydraulic oil is merged with the first hydraulic oil, in which when the working mode is selected, the bypass cut valve unit 300 is opened, and the second confluence control unit 310 is closed, and when the traveling mode is selected, the bypass cut valve unit 300 is closed, and the second confluence control unit 310 is opened, such that the second hydraulic oil is merged with the first hydraulic oil, and the merged hydraulic oil is controlled to be provided to the traveling control unit 100.

In addition, the system for reducing fuel consumption in an excavator according to the present disclosure further includes a first confluence line 41 which connects an upstream side of any one control unit in the first control unit group A of the first bypass line 10 and the second bypass line 20, in which the bypass cut valve unit 300 shuts off the second bypass line 20 when any one control unit in the first control unit group A is operated in the working mode, such that the second hydraulic oil and the first hydraulic oil are merged through the first confluence line 41, and thereafter, are supplied to any one control unit in the first control unit group A.

In addition, the second hydraulic pump P2 of the system for reducing fuel consumption in an excavator according to the present disclosure is a variable capacity pump, and a controller unit 230, which controls the second hydraulic pump P2 so as to increase a traveling speed of the excavator by varying a discharge flow rate of the second hydraulic oil that is discharged from the second hydraulic pump P2, may be further provided.

Specific items of other exemplary embodiments are included in the detailed description and the drawings.

The system for reducing fuel consumption in an excavator according to the present disclosure, which is configured as described above, may reduce a rotational speed of the engine while improving traveling performance (traction force and traveling speed), thereby improving fuel efficiency.

In addition, the system for reducing fuel consumption in an excavator according to the present disclosure may reduce a required rotational horsepower of a cooling fan by reducing the number of revolutions of the engine, thereby improving fuel efficiency while the excavator travels.

In addition, the system for reducing fuel consumption in an excavator according to the present disclosure reduces discharge pressure of the hydraulic oil from the first and second hydraulic pumps, and reduces the rotational speed, such that a loss of energy is reduced, thereby relatively improving fuel efficiency.

In addition, since the system for reducing fuel consumption in an excavator according to the present disclosure does not absolutely use the second bypass line in the traveling mode, a loss of pressure is reduced, thereby reducing a loss of energy.

In addition, the system for reducing fuel consumption in an excavator according to the present disclosure may perform operations of spool control, traveling steering control, traveling braking, and the like of the control units at the number of revolutions (rpm) of the engine in the working mode.

In addition, the system for reducing fuel consumption in an excavator according to the present disclosure sets the number of revolutions (rpm) of the engine in the traveling mode to be equal to the number of revolutions (rpm) of the engine in the working mode, thereby preventing a loss of energy that occurred when the engine was operated in the traveling mode at a speed, which is relatively high in comparison with that in the working mode, with the number of revolutions in the related art.

DESCRIPTION OF MAIN REFERENCE NUMERALS OF DRAWINGS

Figure 1:
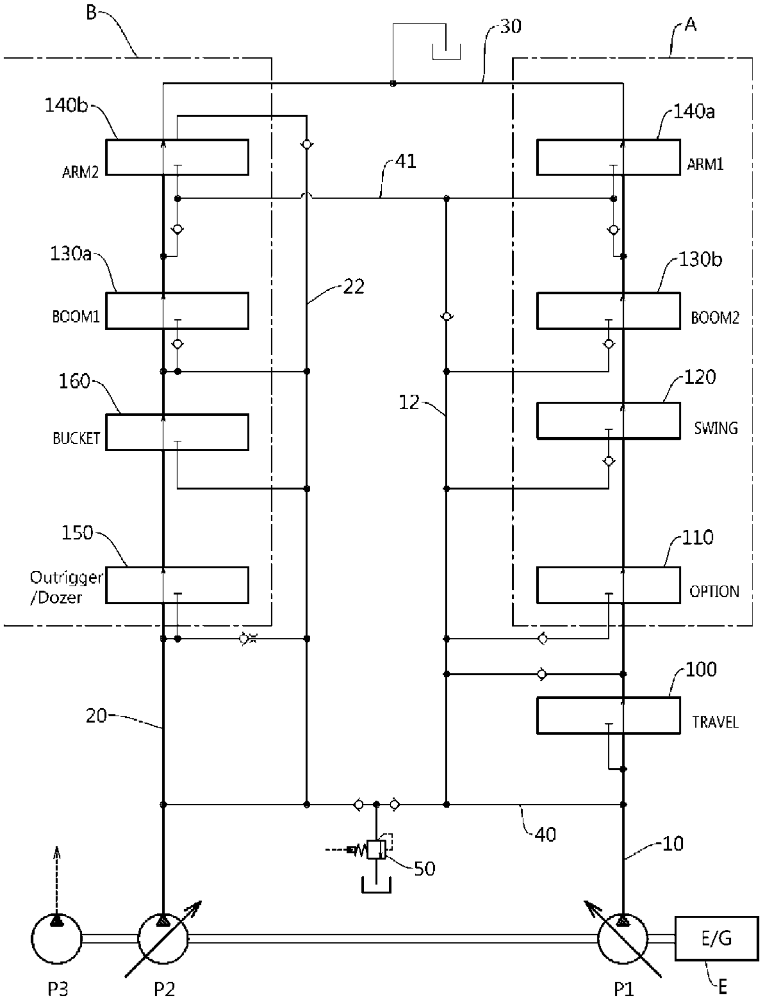
FIG. 1 is a view for explaining a hydraulic circuit system of a general wheel excavator.

P1, P2: First and second hydraulic pumps
P3: Pilot pump
10, 20: First and second bypass lines
12, 22: First and second parallel lines
30: Drain line
40: Safety line
41, 43: First and second confluence lines
42: Bypass line
50: Safety valve unit
A, B: First and second control unit groups
100: Traveling control unit
110: Option control unit
120: Swing control unit
130*a:* First boom control unit
130*b:* Second boom control unit
140*a:* First arm control unit
140*b:* Second arm control unit
150: Outrigger control unit
160: Bucket control unit
200: First confluence control unit
210: Pilot valve unit
220: Switch unit
230: Controller unit
300: Bypass cut valve unit
310: Second confluence control unit

DETAILED DESCRIPTION

Advantages and features of the present disclosure and methods of achieving the advantages and features will be clear with reference to exemplary embodiments described in detail below together with the accompanying drawings.

Like reference numerals indicate like elements throughout the specification, constituent elements identical to constitute elements in the related art will be indicated by the same reference numerals, and detailed descriptions thereof will be omitted.

<First Exemplary Embodiment>

Hereinafter, a system for reducing fuel consumption in an excavator according to a first exemplary embodiment of the present disclosure will be described with reference to FIGS. 2 and 3.

Figure 2:
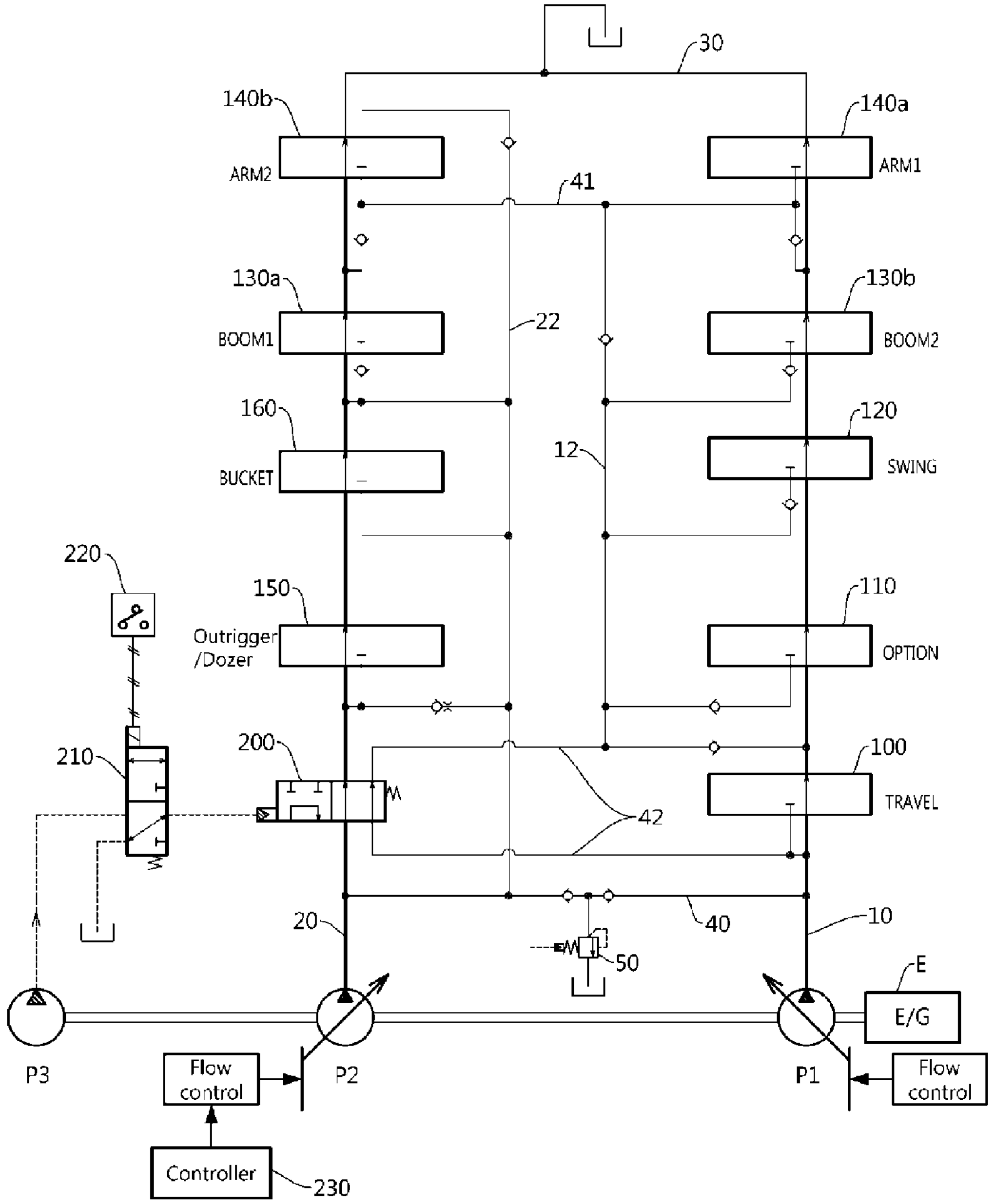
FIGS. 2 and 3 are views for explaining a system for reducing fuel consumption in an excavator according to a first exemplary embodiment of the present disclosure.
Figure 3:
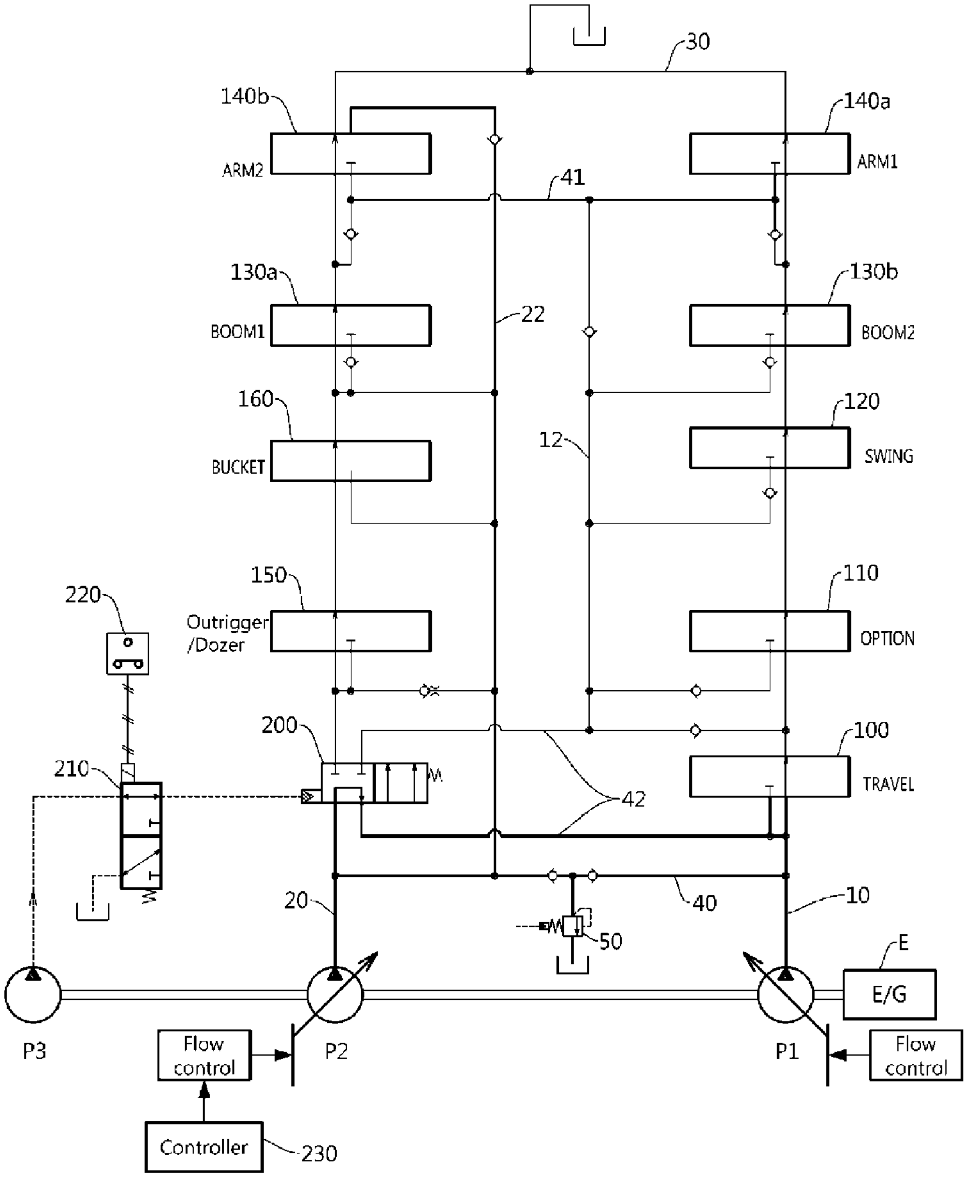

Attached FIGS. 2 and 3 are views for explaining a system for reducing fuel consumption in an excavator according to the first exemplary embodiment of the present disclosure.

As illustrated in FIGS. 2 and 3, in the system for reducing fuel consumption in an excavator according to the first exemplary embodiment of the present disclosure, first and second hydraulic pumps P1 and P2 and a pilot pump P3 are connected to an engine E.

The engine E outputs power, and the first and second hydraulic pumps P1 and P2 are driven by power of the engine E, and discharge first hydraulic oil and second hydraulic oil, respectively.

The first hydraulic oil flows toward a drain line 30 along a first bypass line 10, and a traveling control unit 100 and a first control unit group A (see FIG. 1) are provided in the first bypass line 10.

The first control unit group A includes an option control unit 110, a swing control unit 120, a second boom control unit 130*b,* and a first arm control unit 140*a.*

The second hydraulic oil flows toward the drain line 30 along a second bypass line 20, and a second control unit group B is provided in the second bypass line 20.

The second control unit group B includes an outrigger control unit 150, a bucket control unit 160, a first boom control unit 130*a,* and a second arm control unit 140*b.*

Meanwhile, a bypass line 42 is disposed so that an inlet side of the traveling control unit 100 and an outlet side of the traveling control unit 100 are connected, and the bypass line 42 allows the first hydraulic oil to be provided to the first control unit group A.

In addition, a first confluence control unit 200 is disposed on the second bypass line 20 and the bypass line 42, and the first confluence control unit 200 is disposed at an upstream side of the first and second control unit groups A and B.

In addition, a switch unit 220 is disposed at a driver seat, and the switch unit 220 allows a driver to select any one of a working mode and a traveling mode.

When the traveling mode is selected, all pilot lines, which control the control units of the first and second control unit groups A and B, are shut off.

Meanwhile, when the traveling mode is selected by the switch unit 220, an electrical signal opens a pilot valve unit 210 so that pilot hydraulic oil operates a spool of the first confluence control unit 200.

More particularly, when the working mode is selected by the switch unit 220, as illustrated in FIG. 2, the first confluence control unit 200 is opened so that the first hydraulic oil is provided to the traveling control unit 100 and the first control unit group A, and the second hydraulic oil is provided to the second control unit group B.

In contrast, when the traveling mode is selected by the switch unit 220, as illustrated in FIG. 3, the first confluence control unit 200 blocks the first hydraulic oil and the second hydraulic oil from being provided to the first and second control unit groups A and B, and allows the second hydraulic oil to be merged with the first hydraulic oil via the bypass line 42. The merged hydraulic oil is provided to the traveling control unit 100.

Meanwhile, the aforementioned second hydraulic pump P2 may be a variable capacity pump, and a controller unit 230, which controls the second hydraulic pump P2 so as to increase a traveling speed of the excavator by varying a discharge flow rate of the second hydraulic oil that is discharged from the second hydraulic pump P2, may be further provided.

As described above, the system for reducing fuel consumption in an excavator according to the first exemplary embodiment of the present disclosure may utilize the second hydraulic oil that is discharged from the second hydraulic pump P2 while the excavator travels, and particularly, may provide the second hydraulic oil to the traveling control unit 100, thereby improving traveling performance (traction force and traveling speed) of a traveling motor.

Meanwhile, even though the engine E is not operated at a high speed with the number of revolutions like the related art, the first hydraulic oil and the second hydraulic oil, which are discharged from the first hydraulic pump P1 and the second hydraulic pump P2, may be merged, and may be provided to the traveling motor, thereby reducing the number of revolutions of the engine E.

For example, the number of revolutions of the engine is set to 2,000 rpm when the excavator travels in the traveling mode in the related art, but the number of revolutions of the engine may be reduced to 1,600 rpm, and the number of revolutions of 1,600 rpm is equal to the number of revolutions of the engine E in the working mode.

That is, the system for reducing fuel consumption in an excavator according to the first exemplary embodiment of the present disclosure may reduce a rotational speed of the engine while improving traveling performance (traction force and traveling speed), thereby improving fuel efficiency.

In addition, the system for reducing fuel consumption in an excavator according to the first exemplary embodiment of the present disclosure may reduce a required rotational horsepower of a cooling fan by reducing the number of revolutions of the engine, thereby improving fuel efficiency while the excavator travels, and as a rotational speed of the cooling fan is decreased, it is possible to expect an effect of improving fuel efficiency by 1% to 2% in terms of efficiency of an engine system.

In addition, the system for reducing fuel consumption in an excavator according to the first exemplary embodiment of the present disclosure reduces discharge pressure of the hydraulic oil from the first and second hydraulic pumps, and reduces the rotational speed, such that a loss of energy is reduced, thereby relatively improving fuel efficiency, and more specifically, it is possible to expect an effect of improving fuel efficiency by 2% to 3%.

In addition, since the system for reducing fuel consumption in an excavator according to the first exemplary embodiment of the present disclosure does not absolutely use the second bypass line in the traveling mode, a loss of pressure is reduced accordingly such that a loss of energy may be reduced, and more specifically, it is possible to expect an effect of improving efficiency by about 1%.

In addition, the system for reducing fuel consumption in an excavator according to the first exemplary embodiment of the present disclosure may perform operations of spool control, traveling steering control, traveling braking, and the like of the control units at the number of revolutions (rpm) of the engine in the working mode.

In addition, the system for reducing fuel consumption in an excavator according to the first exemplary embodiment of the present disclosure sets the number of revolutions (rpm) of the engine in the traveling mode to be equal to the number of revolutions (rpm) of the engine in the working mode, thereby preventing a loss of energy that occurred when the engine was operated in the traveling mode at a speed, which is relatively high in comparison with that in the working mode, with the number of revolutions in the related art.

Meanwhile, as the number of revolutions of the engine itself is decreased, it is possible to expect an effect of improving rotational durability and sliding wear resistance of the engine and hydraulic equipment.

In addition, since a difference between the number of revolutions of the engine in the working mode and the number of revolutions of the engine in the traveling mode is reduced, an impact, which is applied to various types of equipment and hydraulic equipment that are provided in the excavator, is reduced, and as a result, it is possible to expect an effect of improving durability.

Meanwhile, traveling performance and dynamic characteristics may be improved, and more particularly, since a volumetric flow rate of the traveling motor is increased, it is possible to shorten a time period for controlling an increase and a decrease in flow rate of the hydraulic oil that is provided to the traveling motor, and as a result, the excavator may quickly and smoothly travel even on a slope.

Meanwhile, since the number of revolutions of the engine is decreased, the number of revolutions of the cooling fan, which is provided at one side of the engine, is decreased, and as a result, it is possible to expect an effect of reducing noise by 4 dB to 5 dB.

<Second Exemplary Embodiment>

Hereinafter, a system for reducing fuel consumption in an excavator according to a second exemplary embodiment of the present disclosure will be described with reference to FIGS. 4 and 5.

Figure 4:
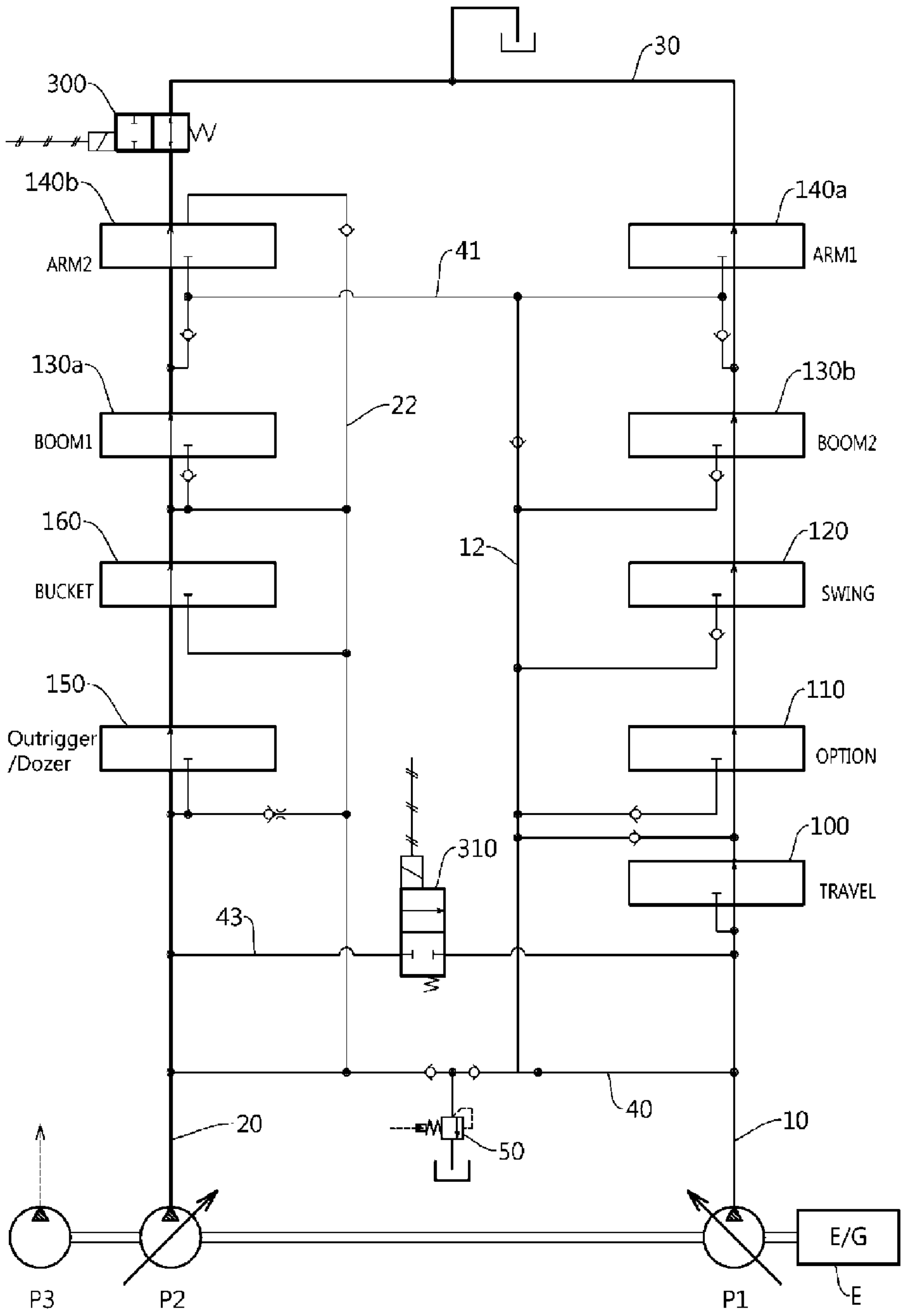
FIGS. 4 and 5 are views for explaining a system for reducing fuel consumption in an excavator according to a second exemplary embodiment of the present disclosure.
Figure 5:
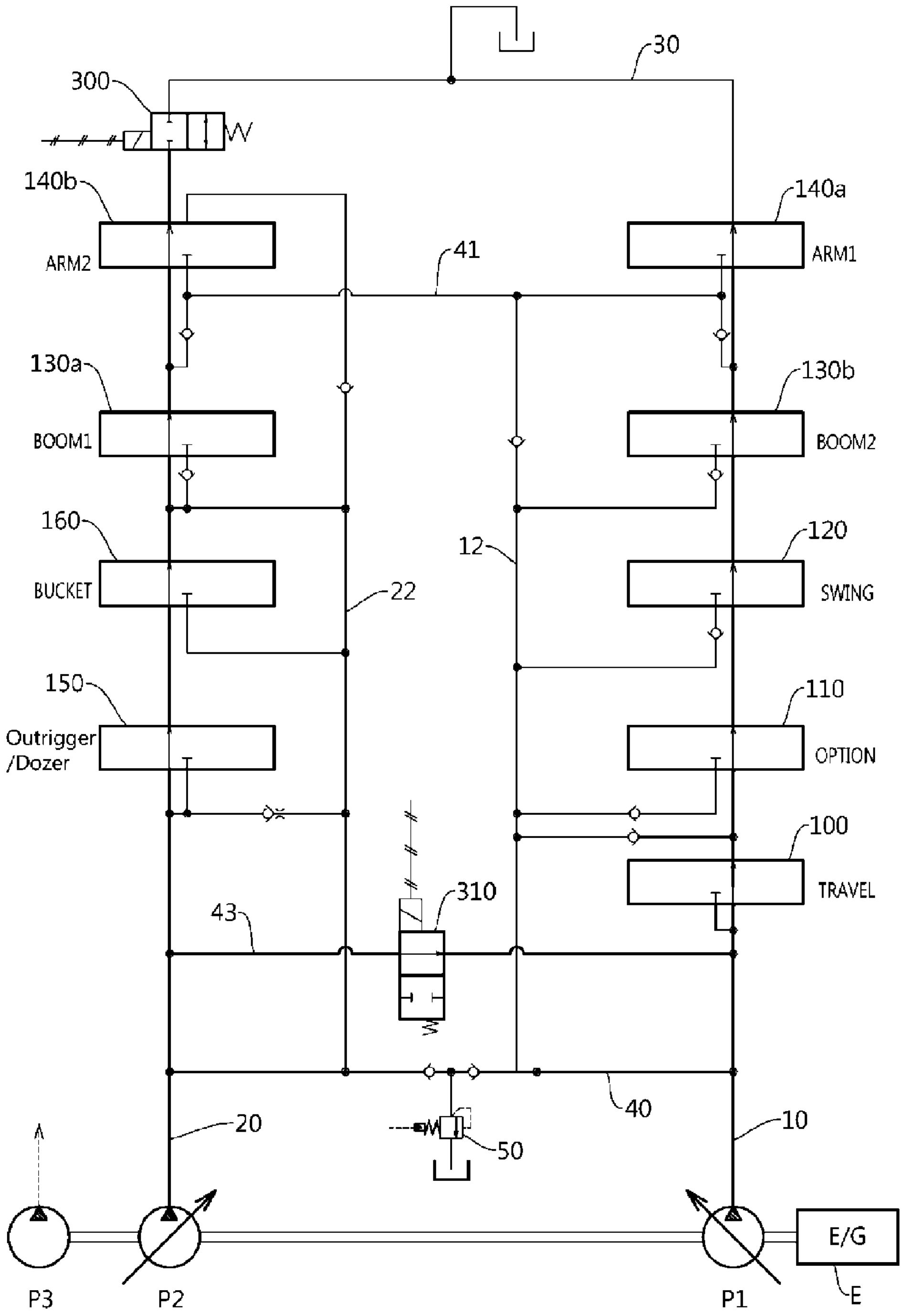

FIGS. 4 and 5 are views for explaining the system for reducing fuel consumption in an excavator according to the second exemplary embodiment of the present disclosure.

Since the system for reducing fuel consumption in an excavator according to the second exemplary embodiment of the present disclosure is an exemplary embodiment in which configurations of a bypass cut valve unit 300 and a second confluence control unit 310 are changed from the system for reducing fuel consumption in an excavator according to the first exemplary embodiment of the present disclosure, a duplicated description of the same configurations will be omitted.

The bypass cut valve unit 300 is disposed at a downstream side of a second control unit group B along a second bypass line 20, and selectively blocks connection between an end of the second bypass line 20 and a drain line 30. The bypass cut valve unit 300 serves to supply hydraulic oil of the second bypass line 20 to an upstream side of any one control unit in a first control unit group A when work is performed. That is, the bypass cut valve unit 300 serves to further supply hydraulic oil of the second bypass line 20 to a specific working device in a case in which a higher flow rate is required in the specific working device, which is controlled by any one control unit in the first control unit group A, while work is performed. In the present exemplary embodiment, the bypass cut valve unit 300 is also operated when the excavator travels.

In addition, a second confluence line 43, which is connected with an inlet side of a traveling control unit 100, and connected with the second bypass line 20 at a front end of the second control unit group B, is provided.

In addition, the second confluence control unit 310 is disposed on the aforementioned second confluence line 43, and performs a control operation so that second hydraulic oil and first hydraulic oil are merged.

When the working mode is selected, the bypass cut valve unit 300 is opened, and the second confluence control unit 310 is closed, as illustrated in FIG. 4.

That is, in the general working mode, the first hydraulic oil is provided to the traveling control unit 100 and the first control unit group A, and the second hydraulic oil is provided to the second control unit group B. In this case, if any one control unit in the first control unit group requires a higher flow rate, the bypass cut valve unit 300 is switched to shut off the second bypass line 20, and to allow the hydraulic oil of the second bypass line 20 to be merged with an upstream side of any one control unit in the first control unit group. The present exemplary embodiment of FIG. 4 is configured to supply the hydraulic oil when an arm is operated.

Meanwhile, when the traveling mode is selected, the bypass cut valve unit 300 blocks the connection between the second bypass line 20 and the drain line 30, and the second confluence control unit 310 opens the second confluence line 43, as illustrated in FIG. 5.

Therefore, the second hydraulic oil is merged with the first hydraulic oil, and the merged hydraulic oil is provided to the traveling control unit 100.

That is, in the system for reducing fuel consumption in an excavator according to the second exemplary embodiment of the present disclosure, the hydraulic oil having a high flow rate is provided to the traveling control unit 100, thereby improving traveling performance of the traveling motor, and as a result, it is possible to expect an effect which is identical to the effect that will be expected in the system for reducing fuel consumption in an excavator according to the first exemplary embodiment of the present disclosure.

The exemplary embodiments of the present disclosure have been described with reference to the accompanying drawings, but those skilled in the art will understand that the present disclosure may be implemented in any other specific form without changing the technical spirit or an essential feature thereof.

Accordingly, it should be understood that the aforementioned exemplary embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

The system for reducing fuel consumption in an excavator according to the present disclosure allows the hydraulic oil, which is discharged from the first hydraulic pump, and the hydraulic oil, which is discharged from the second hydraulic pump when the traveling mode is selected, to be merged and provided to the traveling motor, and may be used to improve traveling performance even in a case in which the number of revolutions of the engine is set to be low.

What is claimed is:

1. A system for reducing fuel consumption in an excavator, comprising:

an engine which outputs power;

first and second hydraulic pumps which are driven by power of the engine, and discharge first hydraulic oil and second hydraulic oil, respectively;

a first bypass line which guides the first hydraulic oil to a drain line via a traveling control unit and a first control unit group;

a second bypass line which guides the second hydraulic oil to the drain line via a second control unit group;

a switch unit which allows any one of a working mode and a traveling mode to be selected; and a confluence control unit which supplies the second hydraulic oil of the second bypass line to an upstream side of the traveling control unit by selectively connecting the first bypass line and the second bypass line, wherein when the traveling mode is selected, the first bypass line and the second bypass line are connected by the confluence control unit, such that the first hydraulic oil and the second hydraulic oil are merged and then supplied to the traveling control unit via the first bypass line only.

2. The system of claim 1, wherein the confluence control unit includes:

a bypass line which branches off from the first bypass line at an upstream side of the traveling control unit, and supplies the first hydraulic oil to the first control unit group while allowing the first hydraulic oil to bypass the traveling control unit; and a first confluence control unit which selectively connects the second bypass line and the bypass line, wherein the first confluence control unit allows the first hydraulic oil to be provided to the first control unit group through the bypass line and allows the second hydraulic oil to be provided to the second control unit group when the working mode is selected, and blocks connection between the second bypass line and the drain line when the traveling mode is selected, such that the second hydraulic oil of the second bypass line is supplied to an upstream side of the traveling control unit through the bypass line, and the first hydraulic oil and the second hydraulic oil are merged and then supplied to the traveling control unit.

3. The system of claim 2, wherein the first confluence control unit blocks connection between the bypass line and the first control unit group when the first hydraulic oil and the second hydraulic oil are merged by the selection of the traveling mode, such that all hydraulic oil, which is discharged from the first hydraulic pump and the second hydraulic pump, is supplied to the traveling control unit.

4. The system of claim 1, wherein the confluence control unit includes:

a bypass cut valve unit which is installed on the second bypass line at a downstream side of the second control unit group, and selectively blocks connection between the second bypass line and the drain line;

a second confluence line which connects an upstream side of the traveling control unit of the first bypass line and the second bypass line; and a second confluence control unit which is disposed on the second confluence line, and opens and closes the second confluence line so that the second hydraulic oil is merged with the first hydraulic oil, wherein when the working mode is selected, the bypass cut valve unit is opened, and the second confluence control unit is closed, and when the traveling mode is selected, the bypass cut valve unit is closed, and the second confluence control unit is opened, such that the second hydraulic oil is merged with the first hydraulic oil, and the merged hydraulic oil is controlled to be provided to the traveling control unit.

5. The system of claim 4, further comprising:

a first confluence line which connects an upstream side of any one control unit in the first control unit group of the first bypass line and the second bypass line, wherein the bypass cut valve unit shuts off the second bypass line when any one control unit in the first control unit group is operated in the working mode, such that the second hydraulic oil and the first hydraulic oil are merged through the first confluence line, and thereafter, are supplied to any one control unit in the first control unit group.

6. The system of claim 1, wherein the second hydraulic pump is a variable capacity pump, and a controller unit, which controls the second hydraulic pump so as to increase a traveling speed of the excavator by varying a discharge flow rate of the second hydraulic oil that is discharged from the second hydraulic pump, is further provided.

7. The system of claim 2, wherein the second hydraulic pump is a variable capacity pump, and a controller unit, which controls the second hydraulic pump so as to increase a traveling speed of the excavator by varying a discharge flow rate of the second hydraulic oil that is discharged from the second hydraulic pump, is further provided.

8. The system of claim 3, wherein the second hydraulic pump is a variable capacity pump, and a controller unit, which controls the second hydraulic pump so as to increase a traveling speed of the excavator by varying a discharge flow rate of the second hydraulic oil that is discharged from the second hydraulic pump, is further provided.

9. The system of claim 4, wherein the second hydraulic pump is a variable capacity pump, and a controller unit, which controls the second hydraulic pump so as to increase a traveling speed of the excavator by varying a discharge flow rate of the second hydraulic oil that is discharged from the second hydraulic pump, is further provided.

10. The system of claim 5, wherein the second hydraulic pump is a variable capacity pump, and a controller unit, which controls the second hydraulic pump so as to increase a traveling speed of the excavator by varying a discharge flow rate of the second hydraulic oil that is discharged from the second hydraulic pump, is further provided.

* * * * *